Figure 1:
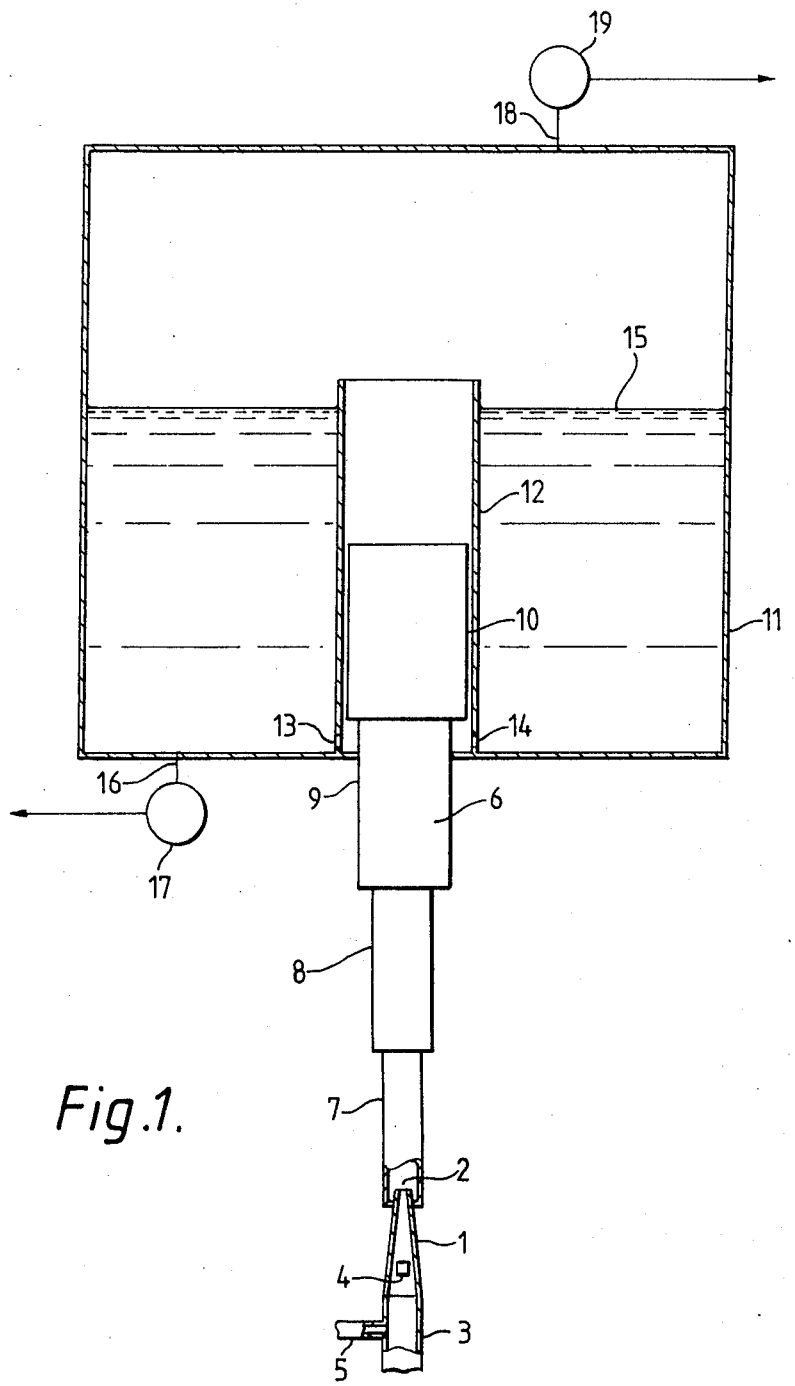

United States Patent [19]

Eastwood et al.

[11] 4,404,179
[45] Sep. 13, 1983

[54] DESTRUCTION OF HYPOCHLORITE

[75] Inventors: Stephen J. Eastwood, Wigan; Kelvin S. Timms, Runcorn, both of England

[73] Assignee: Imperial Chemical Industries PLC, London, England

[21] Appl. No.: 284,949

[22] Filed: Jul. 20, 1981

[30] Foreign Application Priority Data

Aug. 4, 1980 [GB] United Kingdom ................ 8025353

[51] Int. Cl.³ ............................................ C01B 17/02
[52] U.S. Cl. .................................. 423/500; 423/473; 423/504; 204/128
[58] Field of Search ............... 423/179, 473, 500, 502, 423/504, 507; 204/128; 422/224

[56] References Cited

U.S. PATENT DOCUMENTS

| 2,784,057 | 3/1957 | Chisnall | 423/499 |
| 3,507,626 | 4/1970 | Van Horn | 422/224 |
| 4,247,532 | 1/1981 | Saletan et al. | 423/500 X |

FOREIGN PATENT DOCUMENTS

| 708059 | 7/1941 | Fed. Rep. of Germany. | |
| 102987 | 1/1924 | Switzerland. | |
| 597564 | 1/1948 | United Kingdom | 423/500 |
| 1461591 | 1/1977 | United Kingdom. | |

OTHER PUBLICATIONS

Chemical Abstracts 92, 1980, 789 48j.
Japanese Patent Pub. 79-118646.

*Primary Examiner*—Earl C. Thomas
*Attorney, Agent, or Firm*—Cushman, Darby & Cushman

[57] ABSTRACT

Process for destruction of hypochlorite, e.g. sodium hypochlorite, in an apparatus comprising a nozzle connected to one end of a desorption tube the other end of which is connected to a vessel, in the process pressurized acidified liquid issues from the nozzle in the form of a jet which contacts the wall of the desorption tube, hypochlorite solution is mixed with the acidified liquid before the liquid issues from the nozzle, and gaseous chlorine, produced by reaction of the hypochlorite and acid, and liquid are removed from the vessel.

16 Claims, 1 Drawing Figure

DESTRUCTION OF HYPOCHLORITE

This invention relates to a process for the destruction of hypochlorite, particularly an alkali metal hypochlorite, and especially to a process for the destruction of sodium hypochlorite.

Alkali metal hypochlorites, and in particular sodium hypochlorite, are produced on a large scale in industry as an article of commerce for sale.

Sodium hypochlorite is a source of available chlorine and is used widely as a bleaching agent, e.g. for textiles and pulp, and as a disinfecting agent particularly in water, e.g. in swimming pools. Sodium hypochlorite is produced by reaction of chlorine with aqueous sodium hydroxide solution and is generally used in the form of an aqueous solution in water containing about 10% of available chlorine. However, in commercial production of such solutions there are sometimes produced solutions which do not satisfy the required specification for commercially saleable material and the out-of-specification material must be destroyed.

Sodium hypochlorite is also produced as a by-product of the operation of chlor-alkali cells in which aqueous sodium chloride solutions are electrolysed to produce chlorine and aqueous sodium hydroxide solutions. Such electrolytic cells may be mercury cells, diaphragm cells, or membrane cells. In such cells and associated plant there may be vents through which chlorine may escape and, in order to contain the chlorine which escapes, it is necessary to pass the chlorine through traps containing aqueous sodium hydroxide solution and in which sodium hypochlorite solution is thus formed. These sodium hypochlorite solutions are not themselves commercially saleable and they also have to be destroyed.

Destruction of sodium hypochlorite solution may be effected by reacting the solution with acid in order to convert the sodium hypochlorite to sodium chloride and chlorine, the chlorine being recovered for use and/or for sale. However, reaction of sodium hypochlorite solution with acid rapidly produces large volumes of chlorine, the reaction is difficult to control, and there are problems in handling the large volumes of chlorine which are rapidly released.

The present invention relates to a process for the destruction of hypochlorites, particularly alkali metal hypochlorites, e.g. sodium hypochlorite, which may be operated in a readily controllable manner, which may be operated continuously, and which may be operated in a plant of relatively small dimensions.

According to the present invention there is provided a process for the destruction of hypochlorite by reacting hypochlorite with acid to produce chlorine in an apparatus comprising:

(1) a nozzle for converting pressure energy of a liquid into kinetic energy, (2) at least one desorption tube extending from the nozzle and having a gas-tight connection thereto and having an inlet end of larger cross-sectional area than the outlet of the nozzle, and (3) a vessel connected to the outlet end of the desorption tube and having a gas-tight connection thereto, the vessel being equipped with means for removing chlorine and liquid therefrom, the process comprising causing pressurised acidified liquid to be charged to the nozzle and to issue therefrom in the form of a jet which diverges downstream of the nozzle and comes into contact with the entire inner periphery of a part of the desorption tube to seal a totally enclosed space between the jet and the desorption tube, mixing hypochlorite solution with the acidified liquid before the liquid issues from the nozzle, and removing from the vessel gaseous chlorine and liquid which have passed to the vessel.

By "hypochlorite solution" we intend to include any liquid medium containing hypochlorite, including hypochlorous acid. The hypochlorite will generally be a metal hypochlorite and the liquid medium will generally be an aqueous medium. The process of the invention is particularly suitable for use in the destruction of alkali metal hypochlorite, for example sodium hypochlorite, e.g. sodium hypochlorite in the form of an aqueous solution as hereinbefore described which is out-of-specification or which is associated with the operation of a chlor-alkali plant. For simplicity the invention will generally be described hereafter by reference to the destruction of sodium hypochlorite in the form of an aqueous solution but it is to be understood that the invention is not so limited.

Apparatus of the type used in the process of the present invention has been described in British Pat. No. 1461591. In this British Patent use of the apparatus in the de-oxygenation of water is described, and specifically there is described the de-oxygenation of water from an oxygen level of 10 parts per million to a level of 0.7 parts per million. There is no suggestion in the patent that the apparatus may be used in the de-gasification of liquids containing very large proportions of gas, nor is there any suggestion that the apparatus may be adapted for use in effecting chemical reactions such as a hypochlorite destruction process. We find that in the process of the present invention chlorine formed by reaction of hypochlorite with acid may be present in the acidified liquid in a proportion of several thousand parts per million and that in the process a very substantial proportion of this chlorine may be liberated from the acidified liquid in gaseous form such that the resultant liquid contains only a low proportion of chlorine, which may even be below the equilibrium concentration of chlorine in the liquid at the temperature and pressure of operation.

In the process of the invention aqueous sodium hypochlorite solution is mixed with the acidified liquid, which will generally be an acidified aqueous liquid, before the acidified liquid issues from the nozzle in the form of a jet. In general, the sodium hypochlorite solution will be injected into the acidified liquid and we will generally refer hereafter to injection of the sodium hypochlorite solution. The sodium hypochlorite reacts rapidly with the acid and chlorine is liberated. When the liquid issues from the nozzle the resultant jet rapidly evacuates the space between the jet and the desorption tube thereby lowering the pressure in this space surrounding the jet. The desorption tube in the apparatus should be sufficiently long that the divergent jet of liquid expands radially into contact with the entire inner periphery of part of the desorption tube so as to seal the space between the jet and the desorption tube.

Under these conditions the pressure in the space between the jet and the desorption tube is rapidly reduced to a pressure approaching the vapour pressure of the liquid, especially where the liquid is an aqueous liquid. As a result of this reduction in pressure, and of the mixing and turbulence which occurs in that region of the jet which contacts the periphery of the desorption tube, the chlorine liberated by reaction of the sodium hypochlorite with the acid is rapidly liberated from the liquid.

The liquid containing bubbles of chlorine passes along the desorption tube to the vessel from which the liquid and chlorine may be removed separately.

A feed pump may be provided for pressurising the acidified liquid which in the process of the invention is caused to issue from the nozzle in the form of a jet.

The apparatus is also provided with means for injecting sodium hypochlorite solution into the acidified liquid before the liquid issues from the nozzle. The sodium hypochlorite solution is preferably injected shortly before the liquid issues from the nozzle. It is particularly desirable that the sodium hypochlorite solution be injected into the acidified liquid as close to the nozzle as possible so as to avoid the formation of substantial amounts of chlorine before the acidified liquid issues from the nozzle.

The acidified liquid used in the process of the invention will generally be an acidified aqueous liquid, and it may suitably be an aqueous solution containing hydrochloric acid, although solutions of acids other than hydrochloric acid may be used, for example sulphuric acid. Hydrochloric acid is the preferred acid as with this acid there is a reduced possibility of the formation of chlorine dioxide which may be formed if, for example, sulphuric acid is used as the acid.

Furthermore, hydrochloric acid is generally available on chlor-alkali plants. A convenient acidified liquid for use in the process is an acidified brine, for example, an acidified aqueous sodium chloride brine, as such brines are readily available and are used, often in an acidified form, on a large scale in chlor-alkali plants.

A particularly convenient source of acidified liquid is depleted brine from a chlor-alkali cell. In such cells, for example in mercury cells and membrane cells in which chlorine and sodium hydroxide solution are produced by electrolysis of sodium chloride brine, it is conventional to feed to the cell a saturated, or near saturated sodium chloride solution, e.g. a solution having a concentration of 25% weight/weight or greater, and to remove from the cell a solution having a reduced concentration of sodium chloride. Thus, in a mercury cell and in a membrane cell the depleted sodium chloride solution removed from the cell may, for example, have a concentration of about 15% weight/weight. The depleted solutions removed from such cells may be disposed of or they may be re-concentrated with sodium chloride and re-used. However, the brines contain a substantial proportion of dissolved chlorine, for example 300 to 600 parts per million (weight/volume) or even greater, the proportion of chlorine in the brine depending inter alia on the temperature of the brine and on the pressure prevailing in the cell. The disposal of such depleted brines containing chlorine presents an environmental problem and it is necessary to effect a substantial reduction in the proportion of chlorine in the brine before it is disposed of. Where the brine is to be re-used in an electrolytic cell a reduction of the proportion of chlorine in the brine should also be effected. Thus, as such depleted brines must in any case be dechlorinated they are particularly suitable for use as the acidified liquid in the process of the present invention as in the process chlorine is formed in admixture with the acidified liquid by reaction of sodium hypochlorite with acid, and is separated therefrom. Thus, the process of the present invention may be operated so as to achieve the twin objectives of dechlorinating depleted brine from a chlor-alkali cell, and the destruction of sodium hypochlorite.

The rate at which chlorine is produced in the process of the invention will depend inter alia on the rate at which sodium hypochlorite solution is injected and on the concentration of the solution, on the rate at which acidified liquid is caused to pass through the apparatus and on the concentration of the acid in the liquid, and on the temperature and pressure at which the process is operated.

In general the temperature of the acidified liquid will be above 50° C., and may for example be up to 95° C. A convenient temperature is in the range 65° to 90° C. The temperature of depleted brine removed from an electrolytic cell is generally in this range. Higher temperatures are preferred as this assists release from the acidified liquid of the chlorine produced by destruction of the hypochlorite.

The concentration of acid which is required in the acidified liquid will depend on the rate of flow of acidified liquid, on the rate of injection of the sodium hypochlorite solution, and on the strength of the latter solution, that is the strength expressed as percentage of available chlorine. In general, it should be arranged that there is an excess of acid over that required to react fully with the sodium hypochlorite.

The concentration of acid in the acidified liquid will generally not exceed 50 g/l$^{-1}$, although a concentration above this limit may be used.

The rate of injection of sodium hypochlorite solution and the rate at which the acidified liquid is passed through the apparatus will be chosen so that the chlorine is liberated at a manageable rate.

Increase in the pressure of the acidified liquid which is charged to and caused to issue from the nozzle of the apparatus leads to an increase in the rate of flow of the liquid through the apparatus, although this increase in pressure has at most only a marginal effect on release of chlorine from the liquid.

The pressure of the acidified liquid is not particularly critical. The pressure may be up to 100 lb sq.in.$^{-1}$ gauge (6.9 bar gauge) or even greater, e.g. up to 150 lb.sq.in.$^{-1}$ gauge (10.3 bar gauge). A suitable pressure is in the range 30 to 80 lb sq.in$^{-1}$ gauge (2.1 to 5.5 bar gauge).

The nozzle of the apparatus may be provided with an orifice plate having a single outlet orifice which may be of uniform cross-section. Alternatively, the orifice may have a convergent outlet orifice in which case jet expanding means may be provided comprising a member included within the nozzle and having a tapering end pointing axially along the desorption tube extending from the nozzle. This member may be movable axially along the nozzle so as to control the flow of liquid through the nozzle. For convenience the cross-section of the nozzle is circular, although other cross-sectional shapes are possible.

Preferred jet expanding means are provided by deflector vanes which induce rotational movement in the liquid issuing from the nozzle and cause the jet to diverge into contact with the walls of the desorption tube.

The desorption tube, which may be rectilinear, may also conveniently be of circular cross-section and it may be of uniform cross-section, although it is possible to use a desorption tube of gradually diverging cross-section. Alternatively it is possible to use a desorption tube in which the cross-sectional area increases abruptly at one or more positions along the length of the tube so that the jet, in each length of tube bounded by abrupt changes in cross-sectional area, has a smaller cross-sectional area than the inlet end of said length and diverges into contact with the entire periphery of part of the desorption tube near the outlet end of said length.

Expansion of the jet of acidified liquid radially into contact with the entire inner periphery of the desorption tube results insealing of the space enclosed by the vessel from the space between the jet and the desorption tube. This sealing may be assisted by the use of jet expanding means for deflecting the jet radially outwards into contact with the entire inner periphery of part of the desorption tube near the outlet end so as to allow a shorter desorption tube to be used. The jet expanding means may comprise a divergently shaped member mounted axially along the desorption tube, or deflector vanes, as hereinbefore described. The centrifugal force produced by the rotational movement causes the jet to diverge into contact with the entire inner periphery of the desorption tube at a region up stream of the outlet end. One convenient form of such a deflector comprises swirl vanes within the nozzle.

During operation of the process the reduction of pressure of the liquid and the mixing and turbulence in that region of the jet where the outer surface of the jet contacts the periphery of a part of the desorption tube assists the desorption of chlorine from the liquid.

The fluid which flows into the vessel of the apparatus from the desorption tube consists of a mixture of liquid and entrained bubbles of chlorine which are in a form convenient for separation from the brine.

Separation of bubbles of gaseous chlorine from the liquid in the vessel may be effected by ensuring that the liquid in the vessel has a free surface. In order to remove gaseous chlorine it is advantageous to connect extraction means to the space above the free surface of the liquid. Indeed, operation of the process of the invention at a pressure below atmospheric has the advantageous effect that the proportion of chlorine remaining in the liquid may be further reduced. Thus, although the vessel of the apparatus may be at atmospheric pressure, or even at a pressure slightly above atmospheric, e.g. at a pressure up to 1.5 bar absolute (21.8 lb/sq.in absolute), it is preferred to apply a partial vacuum to the vessel, for example, to maintain in the vessel a pressure of 0.8 to 0.2 bar absolute (10.6 to 2.9 bar absolute) or lower, e.g. as low as 0.05 bar absolute (0.7 bar absolute).

The vessel may be provided with means for separate removal of gaseous chlorine and liquid. The vessel may be provided with pump extraction means which is preferably able to remove gaseous chlorine at a rate at least equal to the rate at which chlorine is produced in the reaction. The liquid may be removed from the vessel by means of a pump.

The process of the invention may be operated by causing the pressurised acidified liquid to issue from the nozzle in an upward or in a downward manner. Thus, the vessel may be positioned above the nozzle and connected thereto by the desorption tube, or the vessel may be positioned below the nozzle and connected thereto by the desorption tube.

To increase the throughput of acidified liquid in the process a plurality of nozzles, each associated with a desorption tube, may be connected to the vessel.

The process of the invention is conveniently operated in two or more apparatus of the type described, in a first apparatus sodium hypochlorite solution is injected into the acidified liquid before the liquid issues from the nozzle in the form of a jet, chlorine which is liberated by reaction of the sodium hypochlorite with the acid is removed from the vessel, and the partially dechlorinated liquid phase removed from the vessel is passed through one or more apparatuses of the type described and subjected to further dechlorination.

Alternatively, the process of the invention may be operated in single apparatus of the type described the liquid phase from the vessel, after re-acidification, being repressurised and passed through the apparatus again, that is caused to issue from the nozzle in the form of a jet, the sodium hypochlorite solution being injected into the acidified liquid before the liquid issues from the nozzle. Thus, the acidified liquid may be passed several times through the same apparatus.

Where the vessel is positioned above the nozzle the vessel may contain a tube positioned around the desorption tube at the point at which the desorption tube enters the vessel, the upper end of the tube being positioned at or above the intended level of the liquid in the vessel. This tube may be perforated near its lower end so as to allow circulation of liquid in the vessel, the circulation of liquid reducing the kinetic energy of the liquid entering the vessel thereby inhibiting entrainment into the liquid of gaseous chlorine in the vessel.

The apparatus used in the process of the invention should be constructed of materials which are resistant to corrosion by chlorine, or at least have a surface of such materials. Suitable materials include, for example, titanium. The apparatus may be constructed of plastic materials, or of plastic-lined materials. The vessel may be constructed of mild steel with an inner lining of a suitable corrosion-resistant material, e.g. ebonite.

An embodiment of the process of the present invention will now be described with the aid of the accompanying drawing, FIG. 1, which is a schematic representation of an apparatus in which the process may be carried out.

The apparatus comprises a nozzle (1) having an orifice (2) of cross-sectional area 3.46 cm$^2$ leading via a pipe (3) from a source of pressurised acidified liquid (not shown), the nozzle containing deflector vanes (4) for inducing rotational movement in the liquid issuing from the orifice of the nozzle. The pipe (3) carries a branch (5) leading from a source of sodium hypochlorite solution (not shown) and through which the latter solution may be injected into the acidified liquid. The nozzle (1) is sealed by a gas-tight connection to a desorption tube (6) of circular cross-section which comprises four sections (7,8,9,10) each of which is of uniform cross-sectional area and which are of greater cross-sectional area with increase in the distance from the nozzle (1). The cross-section of the section (7) of the desorption tube which is connected to the nozzle (1) is greater than that of the orifice (2) of the nozzle (1). The sections (7,8,9,10) have lengths of 2.25 cm, 15 cm, 18.3 cm and 30.5 cm respectively and cross-sectional areas of 3.98 cm$^2$, 5.57 cm$^2$, 9.67 cm$^2$ and 14.36 cm$^2$ respectively.

The desorption tube (6) leads into a vessel (11) positioned above the nozzle (1) and is sealed to the vessel by a gas-tight connection. That part of the desorption tube which is within the vessel (11) is surrounded by a tube (12) fixed to the base of the vessel. The lower part of the tube (12) has holes (13, 14) and the upper end is positioned at or above the intended level of the liquid in the vessel, indicated by (15), when the apparatus is to be used in the process of the invention. The lower part of the vessel (11) has an exit port (16) leading to a pump (17) through which dechlorinated liquid may be removed from the vessel, and optionally returned to the nozzle after re-acidification and repressurisation, and the upper part of the vessel (1) has an exit port (18) leading to a pump (19) through which extraction may be applied to the vessel to remove chlorine from the vessel.

In use a source of pressurised acidified liquid is caused to issue from the orifice (2) of the nozzle (1) rotational movement in the issuing jet of liquid being imparted by the deflector vanes (4) in the nozzle (1). Prior to the liquid issuing from the orifice of the nozzle aqueous sodium hypochlorite solution is injected into the liquid via the branch (5). The issuing jet of liquid diverges from the orifice and comes into contact with the entire inner periphery of a part of the wall of the lowest section (7) of the desorption tube (6), and chlorine produced by reaction of the sodium hypochlorite with acid is released from the liquid in the form of bubbles of gaseous chlorine. As the liquid passes upwardly in the desorption tube (6) the jet diverges when it passes from one section of the desorption tube (6) to the next section of increased cross-sectional area so that the jet progressively contacts the entire inner periphery of a part of the walls of each of the sections (8,9,10) of the desorption tube (6), and finally passes into the vessel (11). In the vessel the liquid collects in the lower part and the liberated gaseous chlorine in the upper part, and circulation of the liquid takes place via the holes (13,14) and upwardly in the tube (12), the circulation being induced by the jet issuing from the desorption tube (6). Gaseous chlorine is removed from the vessel (11) by the pump (19), and dechlorinated liquid is removed by the pump (17).

EXAMPLE 1

An aqueous sodium chloride solution at a temperature of 65° C. and containing 16% by weight of sodium chloride and 600 parts per million of chlorine (weight/volume) was mixed with an aqueous solution containing 20% by weight of hydrochloric acid and the mixed solution, at a pressure 2.0 bar gauge (29.0 lb sq.in.$^{-1}$ gauge), was caused to issue from the orifice (2) of the nozzle (1) of the apparatus. The rates of flow of solution from the nozzle corresponded to 9.9 m$^3$ hr$^{-1}$ of chlorinated sodium chloride solution and 0.2 m$^3$ hr$^{-1}$ of hydrochloric acid solution.

An aqueous solution containing 15.7% by weight of sodium hypochlorite was pressurised to a pressure of 3.0 bar gauge (43.5 lb sq.in$^{-1}$ gauge) and injected into the stream of acidified solution via the branch (5). The rate of flow of the sodium hypochlorite solution was 0.014 m$^3$ hr$^{-1}$. The mixed solution issued from the nozzle in the form of a jet which contacted the inner peripheries of the walls of the sections (7,8,9,10) of the desorption tube (6) and thereafter was discharged into the vessel (11) in which the pressure was 0.99 bar absolute (14.35 lb/sq.in. absolute).

Gaseous chlorine which was formed by reaction between the sodium hypochlorite and the hydrochloric acid was removed from the vessel (11) via the exit port (18) and dechlorinated sodium chloride solution was removed via the exit port (16).

In this example the amount of hydrochloric acid used relative to the amount of sodium hypochlorite was in excess of that required theoretically to react with all of the sodium hypochlorite.

Destruction of all of the sodium hypochlorite should theoretically yield a concentration of 258 parts per million (weight/volume) of chlorine in the sodium chloride solution, in addition to the 600 parts per million of chlorine initially present. The concentration of chlorine in the sodium chloride solution removed from the vessel (11) was found to be 270 parts per million.

EXAMPLE 2

The procedure of Example 1 was repeated except that the acidified sodium chloride solution was pressurised to a pressure of 6.0 bar gauge (87.0 lb sq.in.$^{-1}$ gauge). The rate of flow of solution from the nozzle corresponded to 12.7 m$^3$ hr$^{-1}$ of chlorinated sodium chloride solution and 0.2 m$^3$ hr$^{-1}$ of hydrochloric acid solution.

Destruction of all of the sodium hypochlorite should theoretically yield a concentration of 201 parts per million (weight/volume) of chlorine in the sodium chloride solution, in addition to the 600 parts per million of chlorine initially present. The concentration of chlorine in the sodium chloride solution removed from the vessel (11) was found to be 270 parts per million.

EXAMPLE 3

The procedure of Example 1 was repeated except that the temperature of the acidified sodium chloride solution was 76° C., and the sodium chloride solution contained 420 parts per million (weight/volume) of chlorine.

Destruction of all of the sodium hypochlorite should theoretically yield a concentration of 258 parts per million (weight/volume) of chlorine in the sodium chloride solution, in addition to the 420 parts per million of chlorine initially present. The concentration of chlorine in the sodium chloride solution removed from the vessel (11) was found to be 200 parts per million.

EXAMPLE 4

The procedure of Example 1 was repeated except that the acidified sodium chloride solution was pressurised to a pressure of 6.0 bar gauge (87.0 lb.sq.in.$^{-1}$) and the rates of flow of the solutions were as follows, Chlorinated sodium chloride solution 12.7 m$^3$ hr$^{-1}$ Hydrochloric acid solution 0.45 m$^3$ hr$^{-1}$ Sodium hypochlorite solution 0.340 m$^3$ hr$^{-1}$ Destruction of all of the sodium hypochlorite should theoretically yield a concentration of 4876 parts per million (weight/volume) of chlorine in the sodium chloride solution, in addition to the 600 parts per million of chlorine initially present. The concentration of chlorine in the sodium chloride solution removed from the vessel (11) was found to be 350 parts per million.

EXAMPLE 5

The procedure of Example 4 was repeated except that the temperature of the acidified sodium chloride solution was 76° C., and the sodium chloride solution continued 420 parts per million (weight/volume) of chlorine.

Destruction of all of the sodium hypochlorite should theoretically yield a concentration of 4876 parts per million (weight/volume) of chlorine in the sodium chloride solution in addition to the 420 parts per million of chlorine initially present. The concentration of chlorine in the sodium chloride solution removed from the vessel (11) was found to be 300 parts per million.

We claim:

1. A process for the destruction of hypochlorite by reacting the hypochlorite with acid to produce chlorine in an apparatus of the type comprising (1) a nozzle for converting pressure energy of a liquid into kinetic energy,
    (2) at least one desorption tube extending from the nozzle and having a gas-tight connection thereto and having an inlet end of larger cross-sectional area than the outlet of the nozzle, and
    (3) a vessel connected to the outlet end of the desorption tube and having a gas-tight connection thereto, the vessel being equipped with means for removing chlorine and liquid therefrom, the process comprising causing pressured acidified liquid to be charged to the nozzle and to issue therefrom in the form of a jet which diverges downstream of the nozzle and comes into contact with the entire inner periphery of a part of the desorption tube to seal a totally enclosed space between the jet and the desorption tube, mixing hypochlorite solution with the acidified liquid before the liquid issues from the nozzle, and removing from the vessel gaseous chlorine and liquid which have passed to the vessel.

2. A process as claimed in claim 1 characterised in that the acidified liquid is an aqueous solution containing hydrochloric acid.

3. A process as claimed in claim 1 characterised in that the acidified liquid is an aqueous solution containing sodium chloride.

4. A process as claimed in claim 3 characterised in that the acidified liquid is a chlorine-containing aqueous solution of sodium chloride.

5. A process as claimed in any one of claims 1, 2, 3 or 4 characterised in that the temperature of the acidified liquid is in the range 50° C. to 95° C.

6. A process as claimed in claim 5 characterised in that the acidified liquid contains an excess of acid over that required to react with the hypochlorite.

7. A process as claimed in claim 6 characterised in that the concentration of acid in the acidified liquid does not exceed 50 g $l^{-1}$.

8. A process as claimed in claim 7 characterised in that the acidified liquid is pressurised to a pressure in the range 30 to 80 lb sq.in$^{-1}$ gauge.

9. A process as claimed in claim 8 characterised in that the nozzle of the apparatus is provided with jet expanding means.

10. A process as claimed in claim 9 characterised in that in the apparatus the cross-sectional area of the desorption tube increases abruptly at one or more positions along the length of the tube.

11. A process as claimed in claim 10 characterised in that the liquid issues from the nozzle in an upward manner.

12. A process as claimed in claim 11 characterised in that the apparatus comprises a plurality of nozzles each associated with a desorption tube.

13. A process as claimed in claim 12 characterised in that the vessel of the apparatus contains a tube positioned around the desorption tube at the point at which the desorption tube enters the vessel and which is perforated at or near its lower end.

14. A process as claimed in claim 13 characterised in that a partial vacuum is applied to the vessel of the apparatus.

15. A process as claimed in claim 14 characterised in that the pressure in the vessel of the apparatus is maintained in the range 0.8 to 0.2 bar absolute.

16. A process as claimed in claim 15 characterised in that the liquid removed from the vessel is re-acidified, repressurised, and charged to the nozzle of the apparatus.

* * * * *